United States Patent Office 2,800,790
Patented July 30, 1957

2,800,790
PULSE SYSTEM OF STRAIN RECORDING

Donald G. Schover, Chicago, Ill., assignor to the United States of America as represented by the Secretary of the Air Force Application August 29, 1955, Serial No. 531,305

2 Claims. (Cl. 73—88.5)

This invention relates to strain gage systems and particularly to such systems in which the strain gages are attached to and measure the strain in a rotating structure such as an aircraft propeller. In the experimental evaluation of aircraft propellers, the distribution of stress over the surface of the blades during operation is determined by recording and measuring the outputs of a number of strain gage bridges mounted on the blades. Conventional techniques for measuring propeller strain have the disadvantage that the number of gage outputs that may be recorded simultaneously is limited to the number of slip-rings available for conducting gage signal currents from the rotating propeller. This is of considerable importance since several test runs are required to obtain data from a sufficient number of strain gages for accurate evaluation of the propeller.

The principal object of the invention is to increase the number of simultaneous measurements that can be made on the rotating structure, thereby reducing the number of test runs that are required. A further object is to increase the sensitivity of strain gage systems.

These objects are attained by the use of pulse time multiplexing techniques to transmit the outputs of several strain gages through each slip-ring. The system employs rapid sequential sampling of the signals from a number of strain gage bridges. The resulting composite signal may be transmitted over a single slip-ring, amplified and then broken down by means of gate circuits into its components before being applied to individual recording elements. The sampling is accomplished by switching the excitation supply to the bridges rather than the output signals from them. This method has several advantages, including: (a) the switching operation is done on high-level, constant amplitude voltages, (b) only passive elements such as resistors and pulse transformers are required on the propeller, and (c) at any particular instant only one excitation signal is present in the system. The last item results in greatly reduced rejection requirements in the gate circuits. A further advantage of the system is that higher exciting voltages may be utilized with short duration pulse excitation than with steady D. C. excitation, resulting in greater sensitivity of the strain measuring system.

Figure 1:
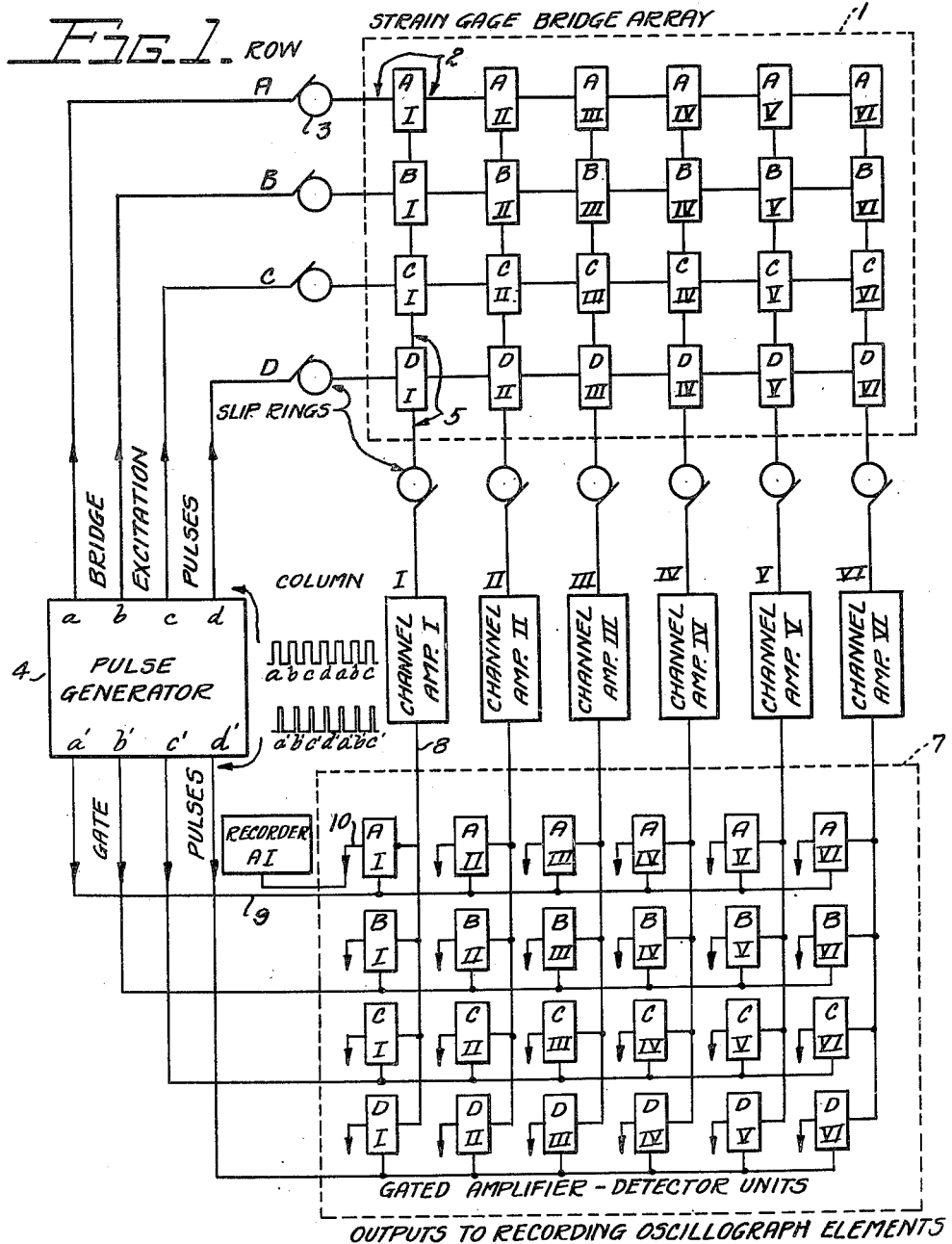
Figure 2:
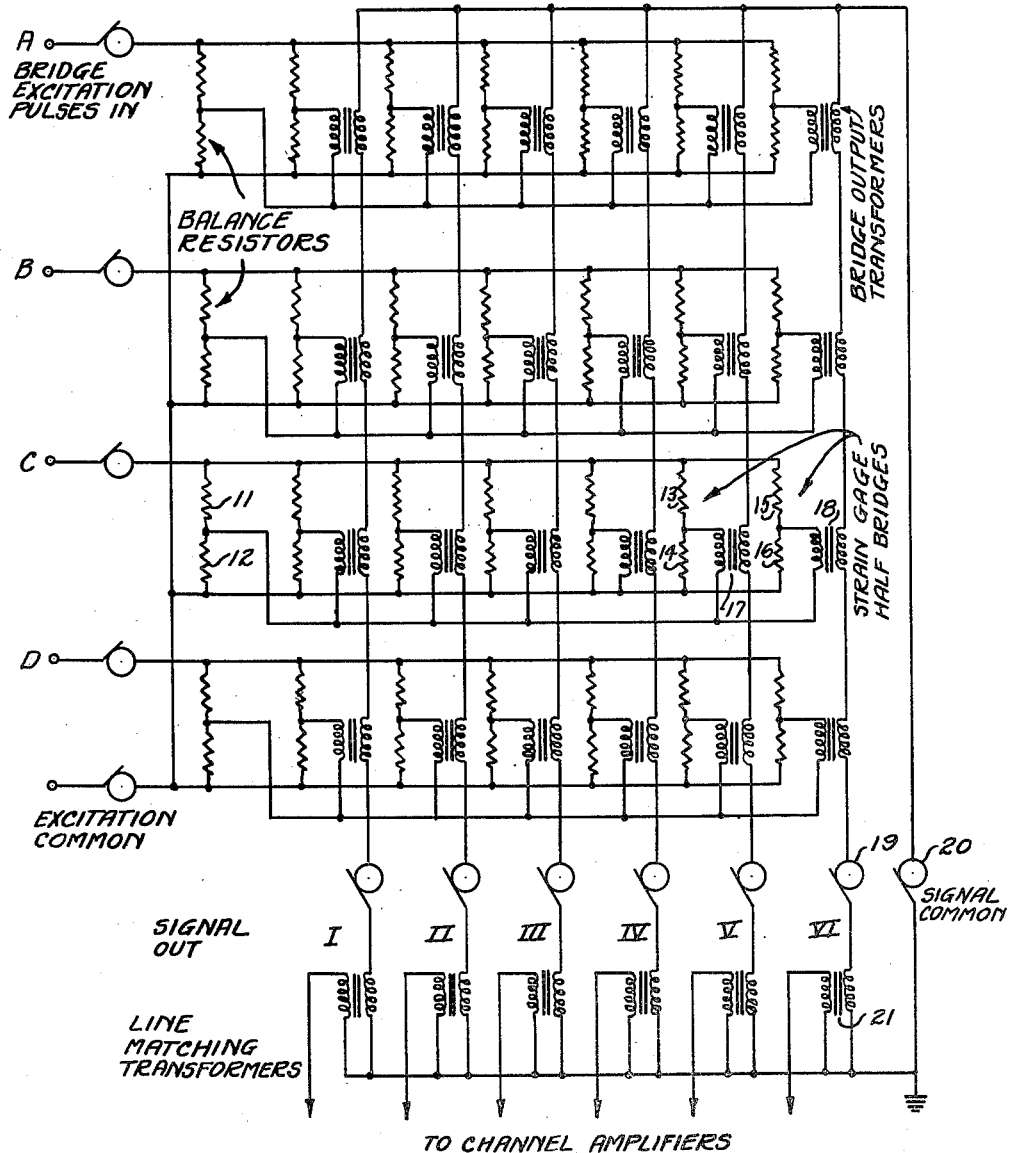

A more detailed description of the invention will be given in connection with the specific embodiment thereof shown in the accompanying drawings, in which:

Fig. 1 is a block diagram of a strain measuring system, in accordance with the invention using twenty-four strain gages, and Fig. 2 is a schematic diagram of that portion of Fig. 1 mounted on the rotating structure.

Referring to Fig. 1, block 1 encloses twenty-four strain gage bridges, the details of which will be explained later, arranged in four rows, designated A, B, C and D, and six columns, designated I, II, III, IV, V and VI. Each bridge is designated by its rows and columns. For example, bridge BIV is situated in row B and column IV.

The bridges in row A have their energizing circuits connected in parallel by conductor 2 and slip-ring 3 to terminal $a$ of pulse generator 4. Similarly the bridges in rows B—D have their energizing circuits connected in parallel and through slip rings to terminals $b$—$d$, respectively, of pulse generator 4.

The strain gage bridges AI—DI in column I have their output circuits connected in series by conductor 5 and this series circuit feeds the input circuit of channel amplifier I through slip-ring 6. Similarly, the bridges of each of columns II—VI are arranged to serially feed the input circuits of channel amplifiers II—VI through individual slip rings.

The channel amplifiers feed an array 7 of gate circuits that corresponds to the array 1 of strain gage bridges. The gate circuits, like the bridges, are designated by row and column. Channel amplifier I feeds gate circuits AI—DI in parallel by means of conductor 8. In a similar manner, channel amplifiers II—VI feed the gate circuits of rows II—VI, respectively. The gate inputs of the gate circuits in each of the rows A—D are connected in parallel to the corresponding terminals $a'$—$d'$ of pulse generator 4. For example, the gate inputs of gate circuits AI—AVI are connected in parallel and through conductor 9 to terminal $a'$ of pulse generator 4. Each gate circuit has an output circuit for connection to a recording device. This circuit is indicated by reference numeral 10 in the case of gate circuit AI.

The pulse generator 4 is designed to produce two continuously repeated series of pulses occurring in the order indicated in Fig. 1. The pulses appearing at terminals $abcd$ serve to energize the strain gage bridges in rows ABCD, respectively, of the strain gage array, while the pulses appearing at terminals $a'b'c'd'$ are applied as gating pulses to the gate circuits in rows ABCD, respectively, of the gate circuit array. The gating pulses preferably end simultaneously with the energizing pulses and have approximately one-half the duration of the energizing pulses, as illustrated in the drawing.

Fig. 2 shows the schematic diagram of a practical arrangement of the strain gage bridge array designated 1 in Fig. 1. The bridges in each row have common balancing resistors. For example, the bridge CV consists of balancing resistors 11 and 12 and strain gages 13 and 14, while bridge CVI consists of balancing resistors 11 and 12 and strain gages 15 and 16. Gages 13 and 15 are the active gages which measure strain; gages 14 and 16 are dummy gages used to accurately match the electrical characteristics of the active gages. The outputs of bridges CV and CVI are taken from the secondary of pulse transformers 17 and 18, respectively, which are connected in the bridge diagonals. As seen in Fig. 2, the output transformer secondary windings of the bridges in each column are connected in series with each other and, through a slip-ring such as 19 and signal common slip-ring 20, in series with the primary of a line matching transformer such as 21. The secondaries of the line transformers feed channel amplifiers I—VI (Fig. 1). The bridges in each row are energized in parallel by pulses derived from one of terminals $abcd$ of pulse generator 4 (Fig. 1) and applied across the bridge diagonals not containing the output transformers, or in effect, across the balancing resistors. An excitation common slip-ring 22 is provided for the four excitation circuits.

The operation of the system will be apparent from Fig. 1. The various rows of strain gage bridges are energized one-at-a-time in recurring sequence by the excitation pulses occurring sequentially at terminals $abcd$ of generator 4. Simultaneously with the energization of any row of bridges, the gates in the corresponding row of gate circuits are opened by the gate pulse applied thereto from the appropriate terminals $a'b'c'd'$ of generator 4, permitting the bridge outputs to pass to their respective recorders.

I claim:

1. A system for measuring strain at a plurality of locations on a rotating structure comprising: a plurality of electrical strain gages attached to said rotating structure, said gages being divisible into a plurality of equal groups; an equal number of electrical gate circuits separate from said rotating structure and divisible into groups corresponding to said strain gage groups, each of said gate circuits having a signal input, a signal output and a gate pulse input; a plurality of coupling circuits equal to the number of units in one of said groups for connecting said strain gages to said gate circuits, each of said coupling circuits containing a rotary coupling and permanently connecting one strain gage in each strain gage group through said rotary coupling to the signal input of one gate circuit in each gate circuit group; a plurality of energizing circuits equal to the number of groups of strain gages and each connected to energize the strain gages of a group in parallel; energizing pulse generating means separate from said rotating structure and connected to each of said energizing circuits through individual rotary couplings for applying short pulses of electrical energy to said energizing circuits individually and in a continuously repeated sequence; a plurality of gating circuits equal to the number of gate circuit groups and each connecting the gate pulse inputs of the gate circuits of one group in parallel; gating pulse generating means synchronized with said energizing pulse generating means for applying electrical gating pulses to said gating circuits individually and in said continuously repeated sequence; and a recorder connected to the signal output of each gating circuit.

2. A system for measuring strain at a plurality of locations on a rotating structure comprising: a plurality of strain gage bridges attached to said rotating structure, said bridges being divisible into a plurality of equal groups, the bridges in each group each consisting of a pair of strain sensitive resistors and a pair of balancing resistors common to all of the bridges in the group; a plurality of pulse transformers equal to the number of bridges and each having its primary winding connected across a diagonal of one of said bridges; a plurality of gate circuits equal to the number of bridges, said gate circuits being separate from said rotating structure and being divisible into groups corresponding to said strain gage groups, each of said gate circuits having a signal input, a signal output and a gate pulse input; a plurality of coupling circuits equal to the number of units in one of said groups for connecting said strain gage bridges to said gate circuits, each of said coupling circuits containing a rotary coupling and permanently connecting the secondaries of the pulse transformers associated with one bridge in each bridge group in series and through said rotary coupling to the signal input of one gate circuit in each gate circuit groups; a plurality of energizing circuits equal to the number of groups of strain gage bridges and each connected to energize the bridges of a group in parallel; energizing pulse generating means separate from said rotating structure and connected to each of said energizing circuits through individual rotary couplings for applying short pulses of energy to said energizing circuits individually and in a continuously repeated sequence; a plurality of gate pulse circuits equal to the number of gate circuit groups and each connecting the gate pulse inputs of the gate circuits of one group in parallel; gating pulse generating means synchronized with said energizing pulse generating means for applying gating pulses to said gate pulse circuits individually and in said continuously repeated sequence; and a recorder connected to the signal output of each gating circuit.

References Cited in the file of this patent

UNITED STATES PATENTS

| | | |
|---|---|---|
| 2,393,669 | Wheaton et al. | Jan. 29, 1946 |
| 2,444,950 | Nichols et al. | July 13, 1948 |
| 2,611,811 | Yates | Sept. 23, 1952 |